United States Patent [19]

Johnson et al.

[11] Patent Number: 5,678,857
[45] Date of Patent: Oct. 21, 1997

[54] ASSEMBLY AND METHOD FOR THE MODERATION OF INFLATOR OUTPUT

[75] Inventors: Darrin L. Johnson, Uintah Highlands; Linda M. Rink, Liberty, both of Utah

[73] Assignee: Morton International, Inc., Chicago, Ill.

[21] Appl. No.: 606,261

[22] Filed: Feb. 23, 1996

[51] Int. Cl.$^6$ .................................................. B60R 21/26
[52] U.S. Cl. ........................ 280/740; 280/742; 280/736
[58] Field of Search ..................... 280/728.2, 740, 280/742, 736, 737, 741, 732, 730.1, 728.1

[56] References Cited

U.S. PATENT DOCUMENTS

| | | | |
|---|---|---|---|
| 3,411,807 | 11/1968 | Carey et al. | 280/740 |
| 3,602,526 | 8/1971 | Brawn | 280/740 |
| 3,784,223 | 1/1974 | Hass et al. | 280/740 |
| 3,863,948 | 2/1975 | Vancil | 280/731 |
| 3,909,037 | 9/1975 | Stewart | 280/738 |
| 4,500,114 | 2/1985 | Grey, Jr. | 280/742 |
| 4,981,534 | 1/1991 | Scheffe | 280/741 |
| 5,016,914 | 5/1991 | Faigle et al. | 280/741 |
| 5,022,674 | 6/1991 | Frantom et al. | 280/737 |
| 5,308,108 | 5/1994 | Rion | 280/740 |
| 5,332,256 | 7/1994 | Lauritzen et al. | 280/732 |
| 5,344,182 | 9/1994 | Lauritzen et al. | 280/728.2 |
| 5,348,344 | 9/1994 | Blumenthal et al. | 280/737 |
| 5,351,989 | 10/1994 | Popek et al. | 280/740 |
| 5,364,127 | 11/1994 | Cuevas | 280/741 |
| 5,441,302 | 8/1995 | Johnson et al. | 280/736 |
| 5,454,586 | 10/1995 | Rogerson | 280/736 |
| 5,470,104 | 11/1995 | Smith et al. | 280/737 |
| 5,470,105 | 11/1995 | Rose et al. | 280/740 |
| 5,494,312 | 2/1996 | Rink et al. | 280/737 |

Primary Examiner—Brian L. Johnson
Assistant Examiner—Peter C. English
Attorney, Agent, or Firm—Nick C. Kottis; Gerald K. White

[57] ABSTRACT

An inflatable restraint system assembly and method of operation are provided wherein a compliance chamber pressure vessel formed about the gas exit area of an inflator appropriately and desirably moderates the inflation gas output from the inflator into an associated inflatable device such as inflatable vehicle occupant restraint. The invention has particular utility for use in conjunction with high mass flow rate inflators.

24 Claims, 8 Drawing Sheets

ASSEMBLY AND METHOD FOR THE MODERATION OF INFLATOR OUTPUT

BACKGROUND OF THE INVENTION

This invention relates generally to inflatable restraint systems and, more particularly, to an apparatus and method for moderating the output of an inflator used in such systems to inflate an inflatable device such as an inflatable vehicle occupant restraint.

It is well known to protect a vehicle occupant using a cushion or bag, e.g., an "airbag," that is inflated or expanded with gas when the vehicle encounters sudden deceleration, such as in a collision. In such systems, the airbag is normally housed in an uninflated and folded condition to minimize space requirements. Upon actuation of the system, the airbag begins being inflated in a matter of no more than a few milliseconds with gas produced or supplied by a device commonly referred to as "an inflator."

Many types of inflator devices have been disclosed in the art for inflating an airbag of an inflatable restraint system. Prior art inflator devices include compressed stored gas inflators, pyrotechnic inflators and hybrid inflators.

Additionally, commonly assigned U.S. Pat. No. 5,470,104, Smith et al., issued Nov. 28, 1995, the disclosure of which is fully incorporated herein by reference, discloses a new type of inflator called a "fluid fueled inflator." Such an inflator device utilizes a fuel material in the form of a fluid, e.g., in the form of a gas, liquid, finely divided solid, or one or more combinations thereof, in the formation of inflation gas for an airbag. In one such inflator device, the fluid fuel material is burned to produce gas which contacts a quantity of stored pressurized gas to produce inflation gas for use in inflating the respective inflatable device.

Typical inflatable restraint systems make use of an airbag module which generally includes an outer reaction housing or canister, commonly referred to as a "reaction can" or, more briefly, as a "can." Such reaction canisters typically function as a structural housing supporting both the inflator and the airbag while providing a mounting base for installation of the assembly in a vehicle and direction to the inflation gases resulting from the inflator.

It will be appreciated that while some prior art passenger side inflatable restraint systems, such as shown in U.S. Pat. No. 5,348,344, have made use of a device sometimes referred to as a "module diffuser" in combination with the reaction canister to redirect and channel inflation gas flow from an inflator into an associated airbag, inflatable restraint systems of the past have generally required changes to the internal components of the inflator device in order to significantly alter the inflation gas flow rates resulting from such systems.

It is to be appreciated that the inflation gas needs (for example, the amount and rate at which inflation gas is passed into an airbag) typically vary for different vehicle model installations and correspondingly different airbag module assemblies. In the past, such varying inflation gas requirements have typically been satisfied through altering the design or design parameters of the inflator (for example, the size or amount of gas producing material contained within the inflator). As a result, in the past, different vehicle model airbag assembly installations have typically required different sized or designed inflators.

It will be appreciated that such need and use of different sized and/or designed inflators can detrimentally impact the costs associated with the manufacture and assembly of such airbag module systems. For example, the use of different sized and/or designed inflators can complicate inflator and module manufacture and assembly as equipment and assembly techniques must be adjusted to account for the different sized and/or designed inflators. In addition, it can be costly to maintain a large inventory of variously sized and designed inflators.

Some inflator designs provide an inflation gas mass flow which, at least in the initial time period after firing of the inflator, may be greater than desired for a particular airbag installation. As a result of such high initial mass flows, such inflators typically produce high initial pressures which can place higher than desired stresses on the associated airbag module components, such as the reaction canister and the airbag, for example. In turn, the associated reaction canisters and airbags must be designed to accommodate such high initial pressures and stress, typically with a corresponding increase in the cost associated of such module components.

Thus, there is a need and a demand for an airbag module assembly and a method of airbag inflator operation which provides improved control or design of the inflation gas flow into an airbag without requiring changes to the design of the inflator.

SUMMARY OF THE INVENTION

A general object of the invention is to provide an improved airbag system combination and method for the operation of an airbag inflator.

A more specific objective of the invention is to overcome one or more of the problems described above.

The general object of the invention can be attained, at least in part, through a combination which includes an airbag inflator having an exit area with a compliance chamber formed thereabout. The inflator exit area is defined by at least one exit opening wherethrough, upon actuation of the inflator, gas for the inflation of an airbag is exhausted. The compliance chamber is defined by a pressure vessel adapted to withstand an internal pressure of at least about 200 psi and has an exit area formed by at least one exit orifice wherethrough the gas for the inflation of the airbag is discharged to the airbag. In the combination, the maximum rate of gaseous mass flow through the compliance chamber exit area is no more than about 300% of the average rate of gaseous mass flow through the compliance chamber exit area and, during the first 10 milliseconds after the inflator begins exhausting gas, the total gaseous mass flow through the compliance chamber exit area is at least 20 percent less than the total gaseous mass flow through the inflator exit area.

The prior art fails to provide an airbag module design and method of airbag inflator operation which, for a high initial mass flow inflator, desirably tailors the delivery of the inflation fluid mass flow to an associated airbag without altering either the inflator or the airbag themselves.

The invention further comprehends an airbag module subassembly including an inflator and a one-piece reaction canister structure body part. The inflator has an exit area defined by at least one exit opening wherethrough, upon actuation of the inflator, gas for the inflation of an airbag is exhausted. With respect to the inflator, a maximum gaseous mass flow rate through the inflator exit area is at least about 300% of the average gaseous mass flow rate through the inflator exit area and the maximum gaseous mass flow rate through the inflator exit area occurs within 5 milliseconds after the inflator begins exhausting gas.

The one-piece reaction canister structure body part includes first and second opposite side walls and a bridging portion joining the first and second opposite side walls wherein at least the bridging portion and the inflator cooperate to form a compliance chamber about the inflator exit area. The compliance chamber is adapted to withstand an internal pressure of at least about 200 psi and has an exit area formed by at least one exit orifice wherethrough the gas for the inflation of the airbag is discharged to the airbag. With respect to the compliance chamber, a maximum gaseous mass flow rate through the compliance chamber exit area is no more than about 300% of the average gaseous mass flow rate through the compliance chamber exit area and less than about 15% of the total mass exiting through the compliance chamber exit area exits within the first 5 milliseconds after the inflator begins exhausting gas.

The invention still further comprehends a method for the operation of an airbag inflator. The inflator has an exit area defined by at least one exit opening wherethrough, upon actuation of the inflator, gas for the inflation of an airbag is exhausted. The method includes the steps of exhausting gas from the inflator, through the inflator exit area, into a compliance chamber. The compliance chamber is adapted to withstand an internal pressure of at least about 200 psi and has an exit area formed by at least one exit orifice. The airbag inflation gas is subsequently discharged from the compliance chamber into the airbag at a maximum gaseous mass flow rate of no more than about 300% of the average gaseous mass flow rate through the compliance chamber exit area. During the first 10 milliseconds after the inflator begins the exhausting of gas, the total mass flow through the compliance chamber exit area is at least 20 percent less than the total mass flow through the inflator exit area.

As used herein, references to an inflator as a "blowdown" inflator or the like are to be understood to refer to an inflator which produces a maximum rate of gaseous mass flow within about 5 milliseconds after the inflator begins exhausting gas and having a maximum rate of gaseous mass flow that is at least 300% of the average rate of gaseous mass flow therefrom.

Further, references to "average" mass flow rates and the like are to be understood to refer to averages taken over the time period during which the inflator is exhausting gas.

Other objects and advantages will be apparent to those skilled in the art from the following detailed description taken in conjunction with the appended claims and drawings.

DETAILED DESCRIPTION OF THE INVENTION

Figure 1:
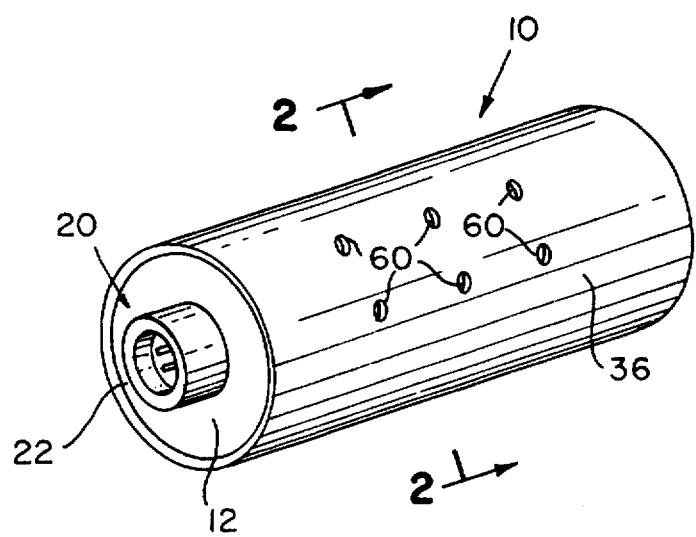
FIG. 1 is a simplified perspective schematic illustration of an airbag system combination including an inflator and a compliance chamber, in accordance with one embodiment of the invention.
Figure 2:
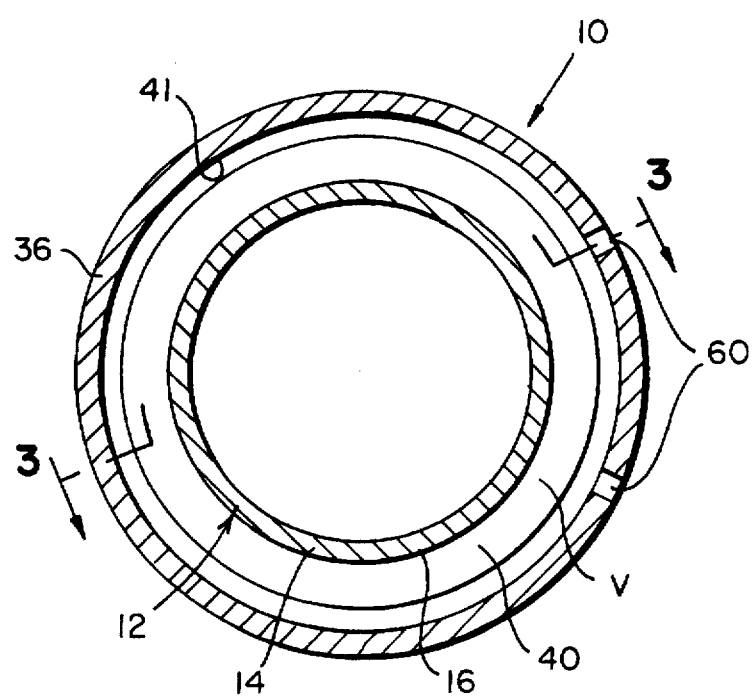
FIG. 2 is a simplified cross sectional view of the airbag system combination of FIG. 1 taken substantially along the lines 2—2 of FIG. 1.
Figure 3:
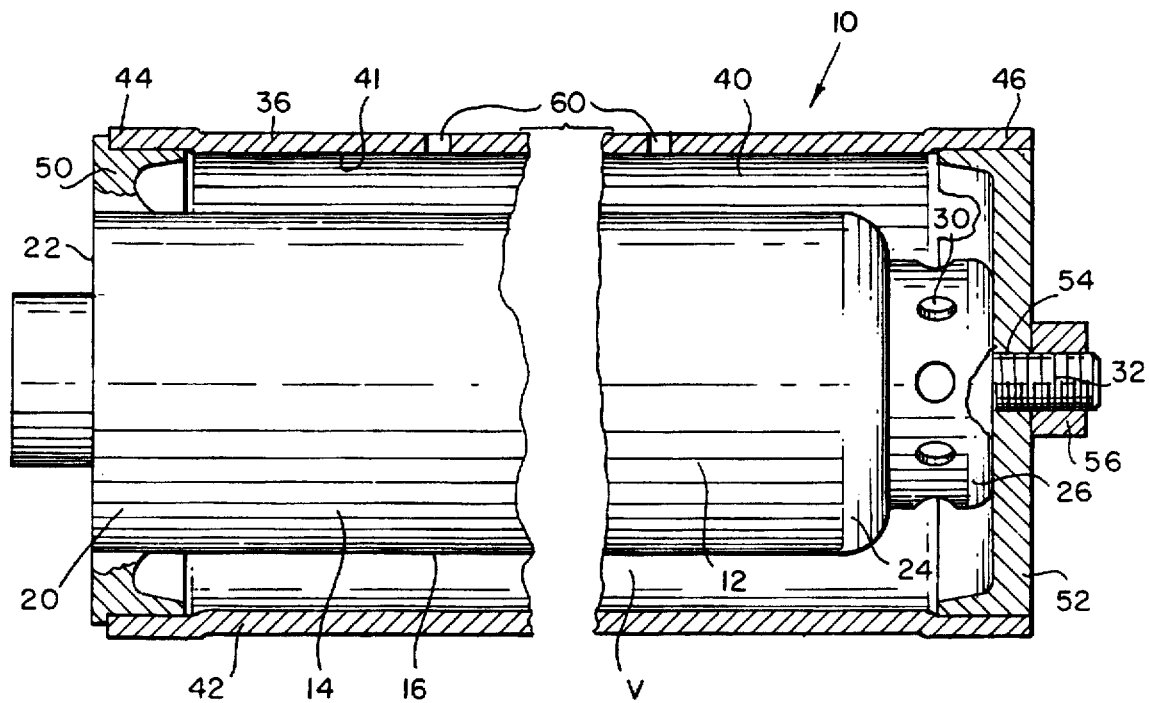
FIG. 3 is a simplified fragmentary, partially in section, side view of the airbag system combination shown in FIGS. 1 and 2, taken substantially along the lines 3—3 of FIG. 2.

An airbag system combination, generally designated by the reference numeral 10 and in accordance with one embodiment of the invention, is shown in perspective view in FIG. 1, cross-sectional view in FIG. 2 and fragmentary, partially in section, side view in FIG. 3. The combination 10 includes an inflator 12 which produces, generates or supplies gas or fluid to inflate the associated airbag (not shown). The inflator 12 includes an elongated, generally cylindrically shaped outer wall 14, having an outer surface 16. The inflator 12 has a first end 20 whereat the outer wall 14 is closed by a base member 22. The inflator 12 includes an opposite second end 24 whereat an inflator diffuser 26 extends external the cylindrically shaped outer wall 14. The diffuser 26 includes exit openings 30 wherethrough, upon actuation of the inflator, gas for the inflation of the airbag is exhausted. Thus, the exit area of the inflator 12 (hereinafter such exit area is designated "A") is defined by totaling the areas of each of the exit openings 30. Also, extending from the diffuser is a mounting stud 32 which, as described below facilitates attachment of the inflator 12 within the assembly combination 10.

The assembly combination 10 also includes an elongated, generally cylindrically shaped pressure vessel 36 forming a chamber 40 (hereinafter referred to as a "compliance chamber") about the inflator exit openings 30.

The pressure vessel 36 is defined by an elongated generally cylindrical sleeve 42, having an inner surface 41, a first end 44 and a second end 46. The first end 44 is closed in sealing relation by means of an end cap 50 formed in one piece with the inflator base member 22. The second end 46 is closed in sealing relation by means of a high pressure end cap 52 having a central opening 54 wherethrough the inflator mounting stud 32 is snugly received and fastened with a nut 56, such that the inflator second end 24 is in abutting relation with the pressure vessel sleeve second end 46. The end caps 50 and 52 close the sleeve first and second ends 44 and 46, respectively, to form a high pressure seal effective to prevent significant leakage in the range of pressures for which such assemblies are commonly designed.

The sleeve 42 includes exit orifices 60 wherethrough, after the inflator begins exhausting gas, gas for the inflation of the airbag is discharged to the airbag. Thus, the exit area of the compliance chamber (hereinafter designated "B") is defined by totaling the areas of each of the exit orifices 60.

A free volume, designated by the letter "V," is formed inside the sleeve 42 between the inflator outer surface 16 and the pressure vessel sleeve inner surface 41. The free volume V has the effect of temporarily storing gas on its passage from the inflator to the airbag, with rate at which the gas is discharged from the combination into the airbag being dependent, at least in part, on the exit area B of the compliance chamber.

The pressure vessel defining the compliance chamber of the invention is generally adapted to withstand an internal pressure of at least about 200 psi or more, preferably at least about 500 psi or more. Generally, the maximum pressure capability of such compliance chambers is an internal pressure of no more than about 3500 psi, preferably an internal pressure of no more than about 1000. The internal pressure capability of the compliance chamber of the invention is preferably in the range of about 500 to about 3500 psi, more preferably, in the range of about 500 to about 1000 psi.

It will be appreciated that the combination of a high mass flow rate inflator with the compliance chamber of the invention permits the inflation gas mass flow rate from the compliance chamber to be greatly reduced as compared to the gas mass flow rate from the inflator itself. Such reduction is believed to result by means of the free volume or capacitance of the compliance chamber which has the effect of temporarily storing gas from the inflator and releasing it to the associated airbag at a rate dependent on the exit area B provided by the compliance chamber exit orifices.

In its broader aspects, the invention is not limited to use of inflators of any specific type or design. For example, the invention can be practiced with compressed stored gas inflators, pyrotechnic inflators, hybrid inflators and fluid fueled inflators.

In general, compliance chambers such as described herein will be preferred for use in conjunction with high mass flow rate inflators, as such use will more generally provide the greatest reductions of airbag stresses and airbag deployment rates without necessitating changes in inflator design. As blowdown inflators are typically or most commonly the inflators having the highest mass flow rates, the use of the compliance chambers described herein with such inflators will be especially desirable.

In particular, the compliance chamber of the invention will be preferred for use with an inflator having a maximum gaseous mass flow rate through the inflator exit area of at least about 300% of the average gaseous mass flow rate through the inflator exit area. The use of the compliance chamber of the invention will be more preferred for such an inflator which also has a maximum mass flow rate through the inflator exit area which occurs within 5 milliseconds, more preferably within 2 milliseconds, and even more preferably within about 0.5 milliseconds after the inflator begins exhausting gas. Further, in at least some embodiments, the use of the compliance chamber of the invention will be preferred for use with an inflator having a maximum gaseous mass flow rate through the inflator exit area of at least about 300% of the average gaseous mass flow rate through the inflator exit area and satisfying at least one of the following conditions:

1. the mass exiting the inflator over the first 5 milliseconds after the inflator begins exhausting gas is greater than 15%, even more preferably greater than 25%, of the total mass exiting the inflator, and
2. the mass exiting the inflator over the first 10 milliseconds after the inflator begins exhausting gas is greater than 30%, even more preferably greater than 40%, of the total mass exiting the inflator.

As described above, the compliance chamber of the invention provides a means by which the gaseous mass flow rate into an associated airbag can be appropriately altered primarily through the design of the compliance chamber free volume and exit area. Preferably, the compliance chamber will alter the mass flow rate from the inflator such that the maximum mass flow rate through the compliance chamber exit area is no more than about 300% of the average mass flow rate through the compliance chamber exit area and that during the first 10 milliseconds after the inflator begins exhausting gas, the total mass flow through the compliance chamber exit area is at least 20 percent and, preferably no more than about 80 percent, less than the total mass flow through the inflator exit area.

Further, in at least some embodiments, the use of the compliance chamber of the invention will be preferred for use with an inflator such that at least one of the following conditions is satisfied:

1. less than about 15% of the total mass exiting through the compliance chamber exit area exits within the first 5 milliseconds after the inflator begins exhausting gas, and
2. less than about 30% of the total mass exiting through the compliance chamber exit area exits within the first 10 milliseconds after the inflator begins exhausting gas.

While the invention has been described above relative to FIGS. 1–3 wherein the inflator 12 is fully received within the compliance chamber sleeve 42, with the free volume V being in general coaxial and surrounding relation with the inflator 12, it is to be appreciated that the invention is not so limited.

Figure 4:
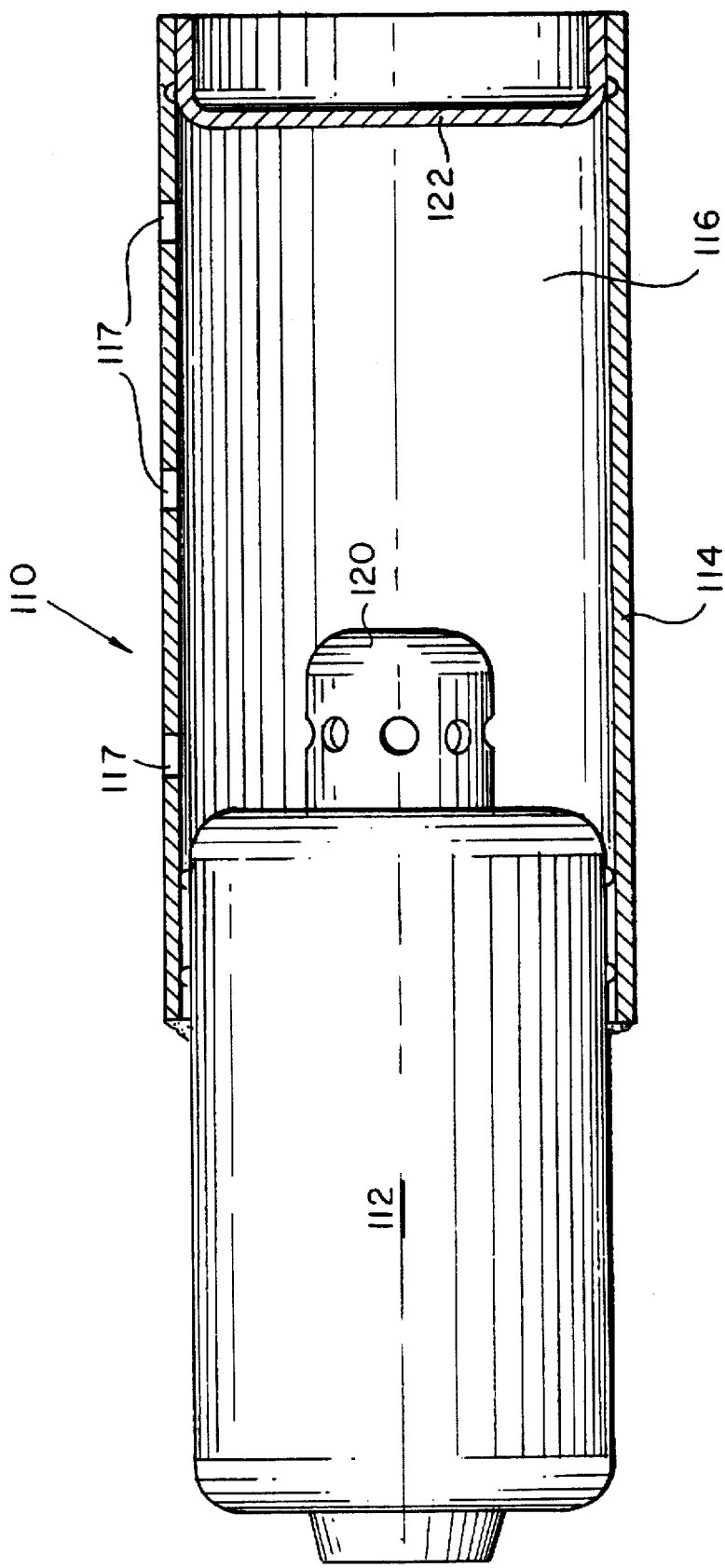
FIG. 4 is a simplified, partially in section, side view of an airbag system combination including an inflator and a compliance chamber, in accordance with an alternative embodiment of the invention.

For example, FIG. 4 shows an airbag system combination 110 similar to the combination 10 of FIGS. 1–3 in that the combination 110 includes an inflator 112 which produces, generates or supplies gas or fluid to inflate the associated airbag (not shown) and a pressure vessel sleeve 114 to form a compliance chamber 116 with exit orifices 117. The combination 110 differs from the combination 10, however, in that the inflator 112 is only partially, rather than fully, received within the pressure vessel sleeve 114, with the inflator 112 and the compliance chamber 116 each having adjacent first ends 120 and 122, respectively, being spaced apart rather than in abutting relation.

Such an arrangement, wherein the inflator is only partially received within the compliance chamber can be particularly desirable for use with high initial mass flow rate inflators of relatively small physical dimensions, such that the compliance chamber can be used to modify the mass flow rate into the associated airbag while conforming to the available storage space in the vehicle.

While the invention has been described above relative to an airbag system combination of an inflator and a compliance chamber it will be understood that such a combination can, if desired, be incorporated as a part of an airbag module design.

Figure 5:
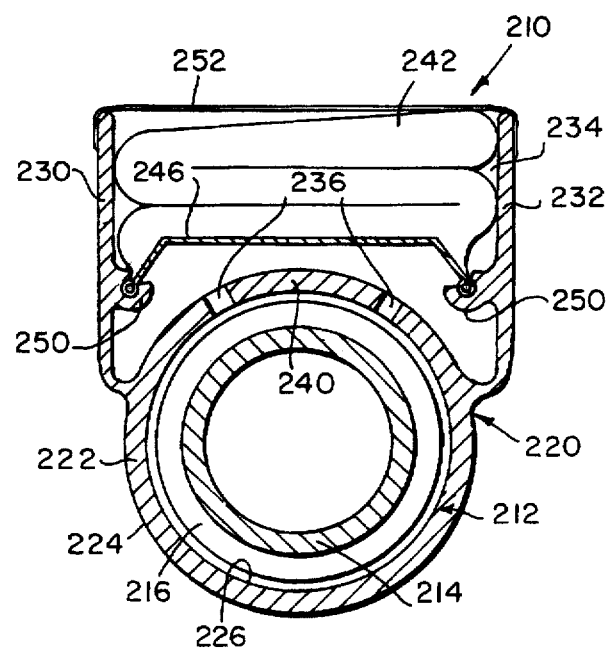
FIG. 5 is a simplified cross sectional end view of an airbag module including an airbag system combination of an inflator and a compliance chamber, in accordance with a preferred embodiment of the invention.

For example, FIG. 5 illustrates an airbag module 210 including an airbag system combination 212 of an inflator 214 and a compliance chamber 216, in accordance with a preferred embodiment of the invention.

More specifically, the airbag module 210 includes an extruded reaction canister body part, generally designated by the reference numeral 220, which includes the general form of a long, narrow, open receptacle or trough.

The reaction canister body part 220 includes, formed in one piece therein and defining the compliance chamber 216, an integrally formed generally cylindrical pressure vessel sleeve or wall 222 having an exterior surface 224 and an interior surface 226. Similar to the assembly combination 10 of FIGS. 1–3, fully received within the compliance chamber generally cylindrical pressure vessel sleeve 222 is the inflator 214.

The formation of the compliance chamber pressure vessel sleeve 222 in the form of a tube having a circular cross section will generally be preferred as such a structure is generally best suited for use in such applications wherein the chamber must withstand such pressure operation. It is to be understood, however, that in the practice of the invention, if desired, other shapes or forms of a compliance chamber can be used.

The internal components of the inflator 214 may be, for example, any of a number of known constructions/formulations such as are commercially available.

The reaction canister body part 220 includes first and second opposite side walls or panels, designated 230 and 232, respectively. The side walls can, for example, be formed directly continuous in one piece with the integrally formed pressure vessel sleeve 222. It will be appreciated that in such an assembly, the pressure vessel sleeve 222 forms a bridging portion 240 joining the side walls 230 and 232, respectively.

The side walls 230 and 232, respectively, can generally be spaced apart so as to form an airbag retaining cavity, generally designated by the reference numeral 234, therebetween. In one preferred embodiment and as shown in FIG. 5, the spaced apart side walls are generally parallel to each other, ensuring a more uniformly shaped airbag retaining cavity and thereby reducing the possibility of the airbag housed within the cavity therebetween undesirably getting caught or snagged such as by a protruding surface or edge of the reaction canister body part. It is to be understood, however, that the side walls can be otherwise angularly positioned relative to one another as may be desired in specific applications, such as to permit the accommodation of the reaction canister into a specifically shaped dash board or instrument panel opening.

While in the illustrated embodiment, the side walls 230 and 232 are shown as being of generally the same lengths, it is to be understood, however, that the invention is not limited to use in conjunction with reaction canister side walls of such relative length. That is, the invention can similarly be used in conjunction with reaction canister body parts having side walls of dissimilar lengths such as reaction canister body parts wherein the length of the top side wall exceeds that of the bottom side wall and vice versa.

The compliance chamber 216 includes exit orifices 236 along the bridging portion 240 of the pressure vessel sleeve 222. Such exit orifices permit gas to exit from the chamber 216 and be directed for inflation of an airbag 242.

To assist in producing or forming a more uniform or orderly distribution of gas into the inflating airbag and whereby a more uniformly and/or orderly deployment of the inflating airbag can be effected, one or more flow directing devices can be incorporated within the reaction canister assembly. For example, such flow directing devices can take the shape or form of baffles or gas port passages of particular size, shape and/or arrangement.

In one preferred embodiment of the invention, such flow directing devices can take the form of and/or include an airbag retainer/diffuser device 246. A preferred such device or system for use in the practice of the invention is a retainer device/system, such as described in commonly assigned U.S. Pat. No. 5,344,182, Lauritzen et al., issued Sep. 6, 1994, and which device/system incorporates diffuser face member features such as described in commonly assigned U.S. Pat. No. 5,470,105, Rose et al., issued Nov. 28, 1995, the text of which documents are fully incorporated herein by reference. As disclosed therein, the size, geometry, and arrangement of gas passage openings in the airbag retainer/diffuser can be appropriately designed to satisfy specific application needs and the invention is not necessarily limited to use with a diffuser with gas passage openings of any specific configuration. Further, as disclosed therein, such a diffuser device/system, in addition to fostering desired gas diffusion can also assist in: 1) facilitating module assembly; 2) maintaining proper airbag retention within the assembly, and 3) maintaining desired separation of the hot inflator surfaces from both the surface of the airbag as well as from contact by the vehicle occupants. For example, relative to the retaining of an airbag within the assembly, such a means of retaining an airbag can advantageously avoid or minimize the need for conventional fastener devices such as screws or rivets, for example.

In addition, a diffuser device/system, such as the diffuser 246, can serve to facilitate control of bell mouthing of the reaction canister, thereby assisting in maintaining the integrity of the reaction canister.

The reaction canister body part 220 includes, as a part of the side walls 230 and 232, integrally formed attachment sleeves 250. As fully described in the above-referenced U.S. Pat. No. 5,344,182, such attachment sleeves allow for the fastenerless attachment of an airbag within an inflatable safety system. It is to be understood, however, that the practice of the subject invention in its broader aspects is not limited to use with such attachment sleeves and that, if desired, an alternative form of airbag retention/diffuser attachment preparation can be used, such as those that include fastener devices such as screws or rivets, such as described in the above-referenced U.S. Pat. No. 5,470,105, for example. Further, it is to be understood that, if desired, the invention can be practiced via the utilization of a cushion retainer, such as disclosed in the above-referenced U.S. Pat. No. 5,344,182, which device serves to retain an airbag (e.g., a cushion) within the assembly while minimizing or, preferably, avoiding the use of fasteners such as screws or rivets, but which in this case does not necessarily incorporate diffuser features therein. Also, it is to be understood that, if desired, the invention can be practiced both without the utilization of the referenced diffuser features and while making use of common forms of airbag attachment, such as the use of fasteners such as screws and/or rivets, for example.

The airbag module 210 further includes a protective cover 252 such as of fiber reinforced paper, for example, in the form of a wrap joined to the reaction canister body part 220 about the airbag 242 within the airbag retaining cavity 234 of the assembly. Such a protective cover can serve to help protect the airbag from damage such as by accidental or other undesired contact such as by or with other elements of the inflatable restraint system as well as extraneous elements in the environment to which the airbag can be exposed. Also, such a protective cover serves to desirably keep debris out of the reaction canister assembly.

In practice, such a protective cover is preferably fabricated of a tough, wear resistant material which, while normally tear resistant, can be preferably broken or ruptured at predetermined or selected sites such as through the aid of perforations therein. For example, such a protective cover can be fabricated of fiber reinforced paper, such as that sold by E. I. Du Pont de Nemours Co. under the name TYVEK. It is to be understood, however, that other appropriate materials such as having such described or preferred properties or characteristics can also be used.

It will be appreciated that typical passenger side airbag modules include some form of end plate closures at the opposite ends of the module. However, as such end closures and the means and methods by which they are attached form no part of this invention, they will not be further described herein.

Such a body part can preferably be fabricated by a continuous extrusion of an extrudable material, such as magnesium or, preferably, aluminum; which material is able to withstand the high temperatures and pressures to which such body part would typically be subjected to in such inflatable restraint system applications. Further, such extrusion fabrication of the body part permits the rapid fabrication of the body with the added advantage that the extrusion can be cut to varying lengths to permit incorporation thereof in variously sized assemblies.

Generally, the reaction canister body part of the invention will preferably be formed from one material and it will be preferred that the wall forming the compliance chamber pressure vessel sleeve will be thicker than the balance of the wall portions of the part, i.e., the thickness of the sleeve 222 will exceed the thickness of the side walls 230 and 232, respectively. Such thicker wall portions are better suited to contain the relatively high inflation gas pressures, such as described above and which may be realized within the compliance chamber structure of the invention, in accordance with the invention.

The present invention is described in further detail in connection with the following computer simulated examples which illustrate various aspects involved in the practice of the invention. It is to be understood that all changes that come within the spirit of the invention are desired to be protected and thus the invention is not to be construed as limited by these examples.

The graphs shown in FIGS. 6 through 10 are of pressure as a function of time derived using the computer simulation program called "MAX-FF." The MAX-FF computer simulation program uses gas dynamic theory with energy equations from thermodynamic theory to predict inflator exit properties such as mass flow, pressure, and gas temperature for an airbag system wherein an inflator has been fired.

For ease of comparison and to simplify the calculations, a constant airbag volume of 100 liters is assumed.

In accordance with the model, the gas flow is tracked temporally for the gas exiting the inflator. In addition, where appropriate, the gas accumulation in the compliance chamber and gas flow exiting the compliance chamber and into the airbag are also calculated.

COMPARATIVE EXAMPLE 1

Figure 6:
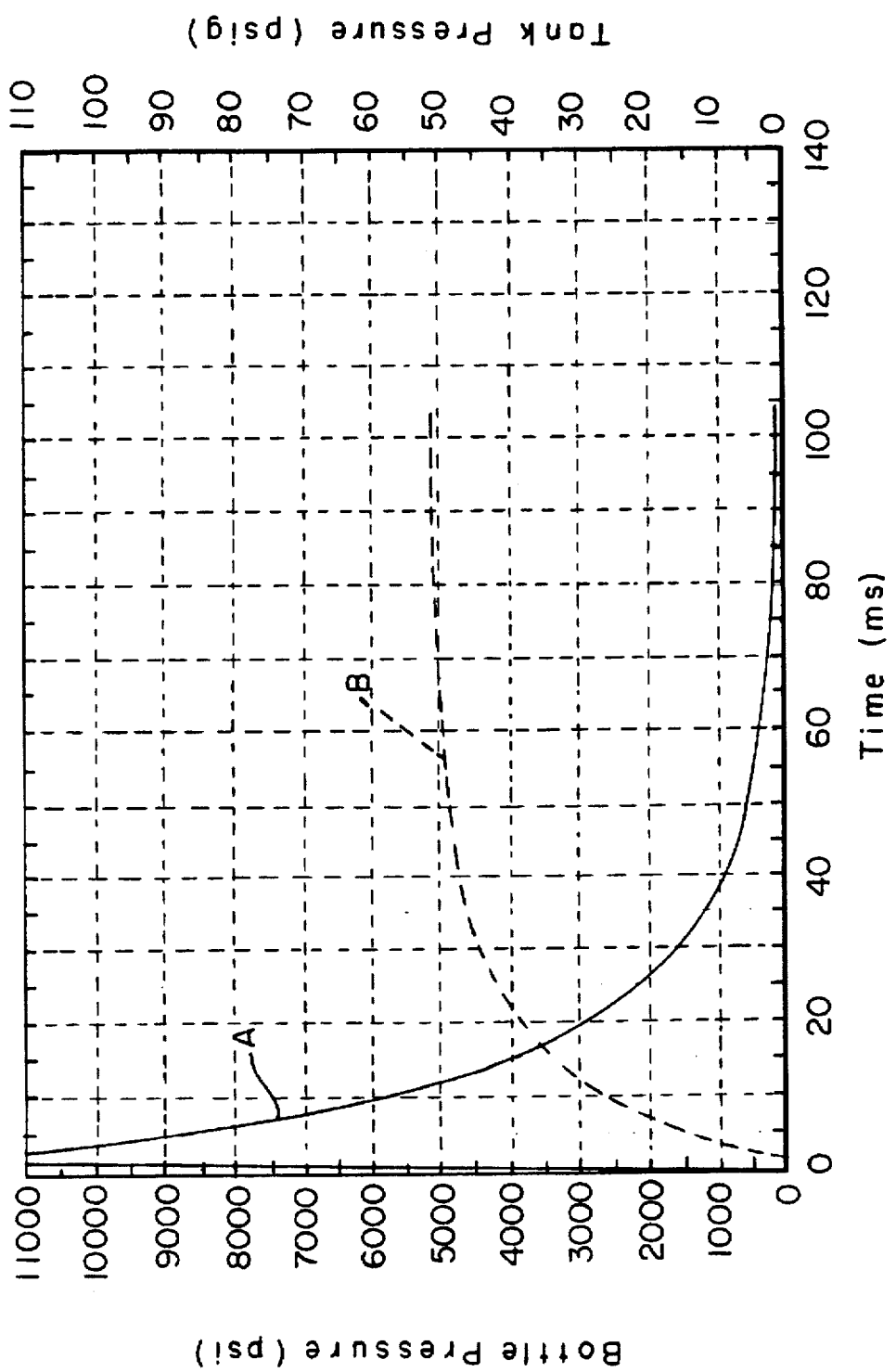
FIG. 6 is a graphical depiction of the pressure within an inflator (bottle pressure) and the airbag (tank pressure), respectively, as a function of time, as calculated via a computer model in COMPARATIVE EXAMPLE 1, for an airbag system without a compliance chamber in accordance with the invention.

FIG. 6 illustrates the pressure within an inflator (bottle pressure) (designated curve A) and the airbag (tank pressure) (designated curve B), respectively, as a function of time, as calculated via the computer model, for an airbag system having a blowdown inflator without a compliance chamber.

EXAMPLES 1-4

In Examples 1-4, the inflator (bottle pressure), compliance chamber, and airbag (tank pressure), respectively, as a function of time, were calculated for a simulated airbag system arrangement similar to that show in FIGS. 1-3 (e.g., utilizing the same blowdown inflator used in COMPARATIVE EXAMPLE 1) with the following changes/additions:

Example 1

The addition of a compliance chamber having a free volume of 28 in$^3$ and an exit area of 0.137 in$^2$.

Example 2

The same arrangement as in Example 1 but with the compliance chamber having an exit area increased to 0.187 in$^2$.

Example 3

The same arrangement as in Example 1 but with the compliance chamber having an exit area increased to 0.25 in$^2$.

Example 4

The same arrangement as in Example 3 (i.e., the compliance chamber exit area is 0.25 in$^2$) but with the compliance chamber having a free volume increased to 47 in$^3$.

FIGS. 7 through 10 are graphical depictions of pressure within an inflator (bottle pressure) (designated curve A), compliance chamber (designated curve C), and airbag (tank pressure) (designated curve B), respectively, as a function of time, calculated in EXAMPLES 1 through 4, respectively.

Figure 7:
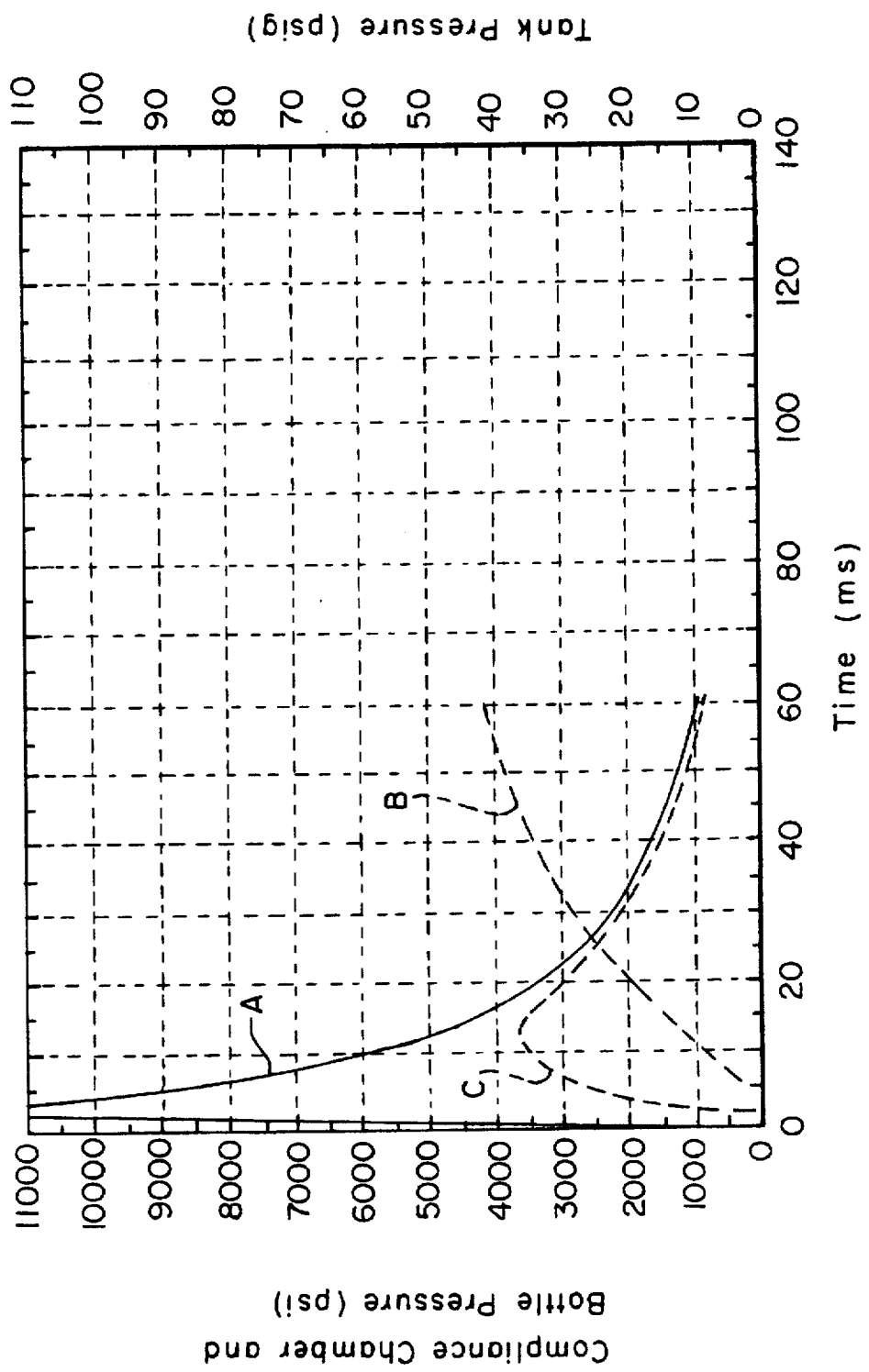
FIGS. 7 through 10 are graphical depictions of pressure within an inflator (bottle pressure), compliance chamber, and airbag (tank pressure), respectively, as a function of time, as calculated via a computer model in EXAMPLES 1 through 4, for an airbag system similar to that of COMPARATIVE EXAMPLE 1 but now with a compliance chamber of selected volume and exit area, in accordance with the invention.

As shown in FIGS. 6 and 7, the addition of a compliance chamber results in reducing the airbag pressure rise rate (i.e., change in tank pressure versus time).

Figure 8:
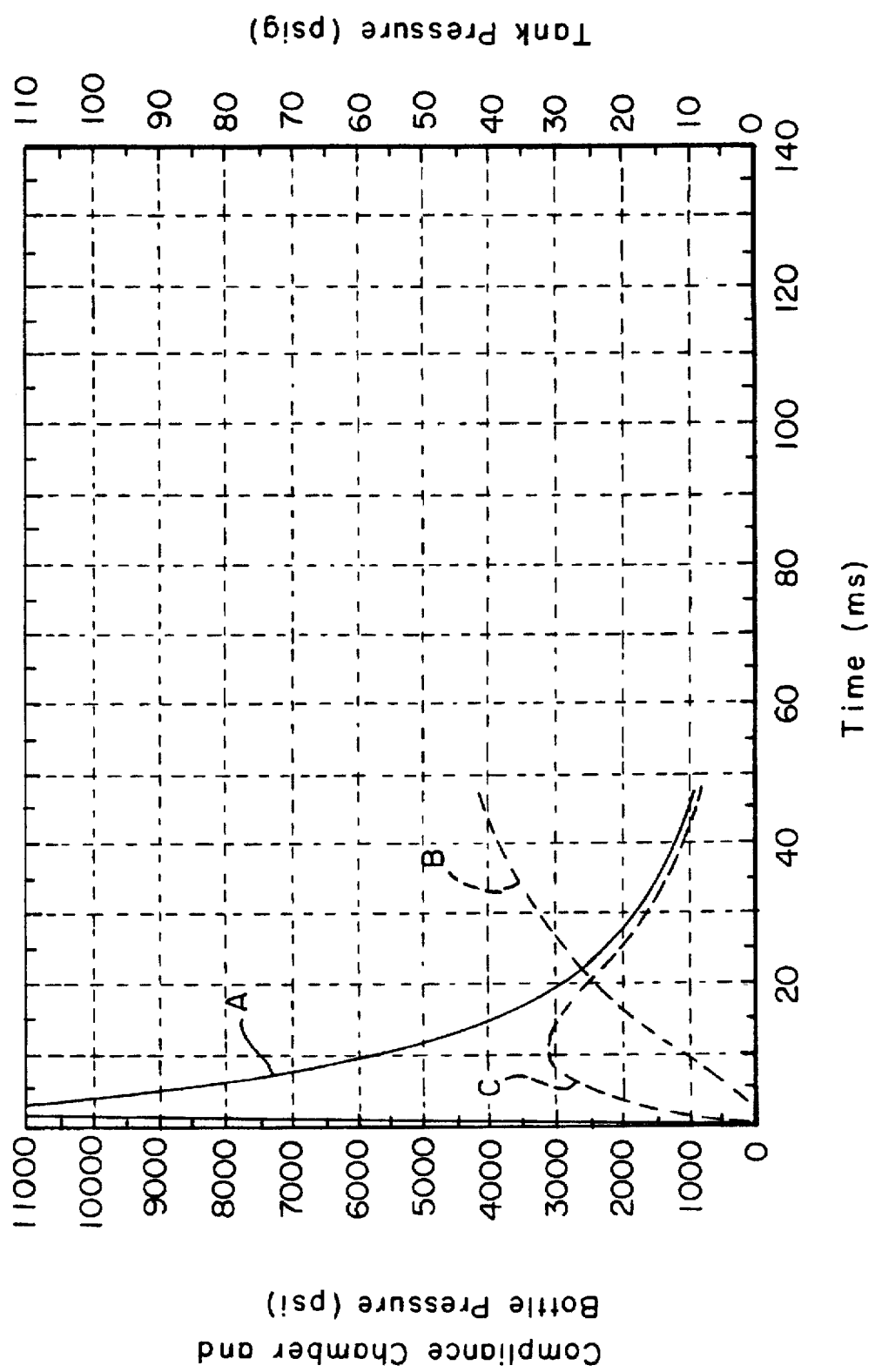
Figure 9:
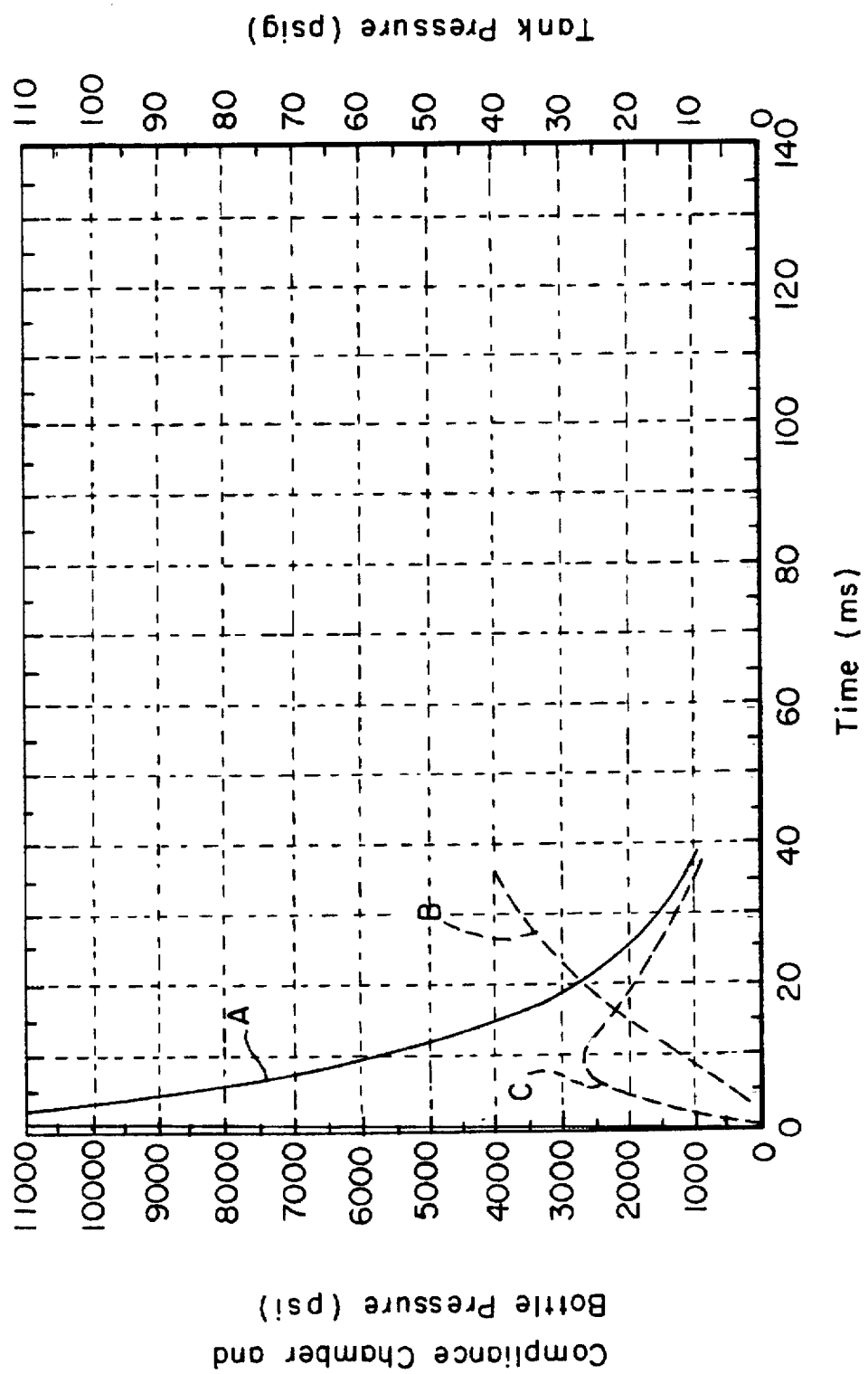

As shown in FIGS. 7 through 9, for a compliance chamber with a fixed free volume, increasing the compliance chamber exit area reduces the compliance chamber internal pressure and increases the airbag pressure rise rate (i.e., change in tank pressure versus time).

Figure 10:
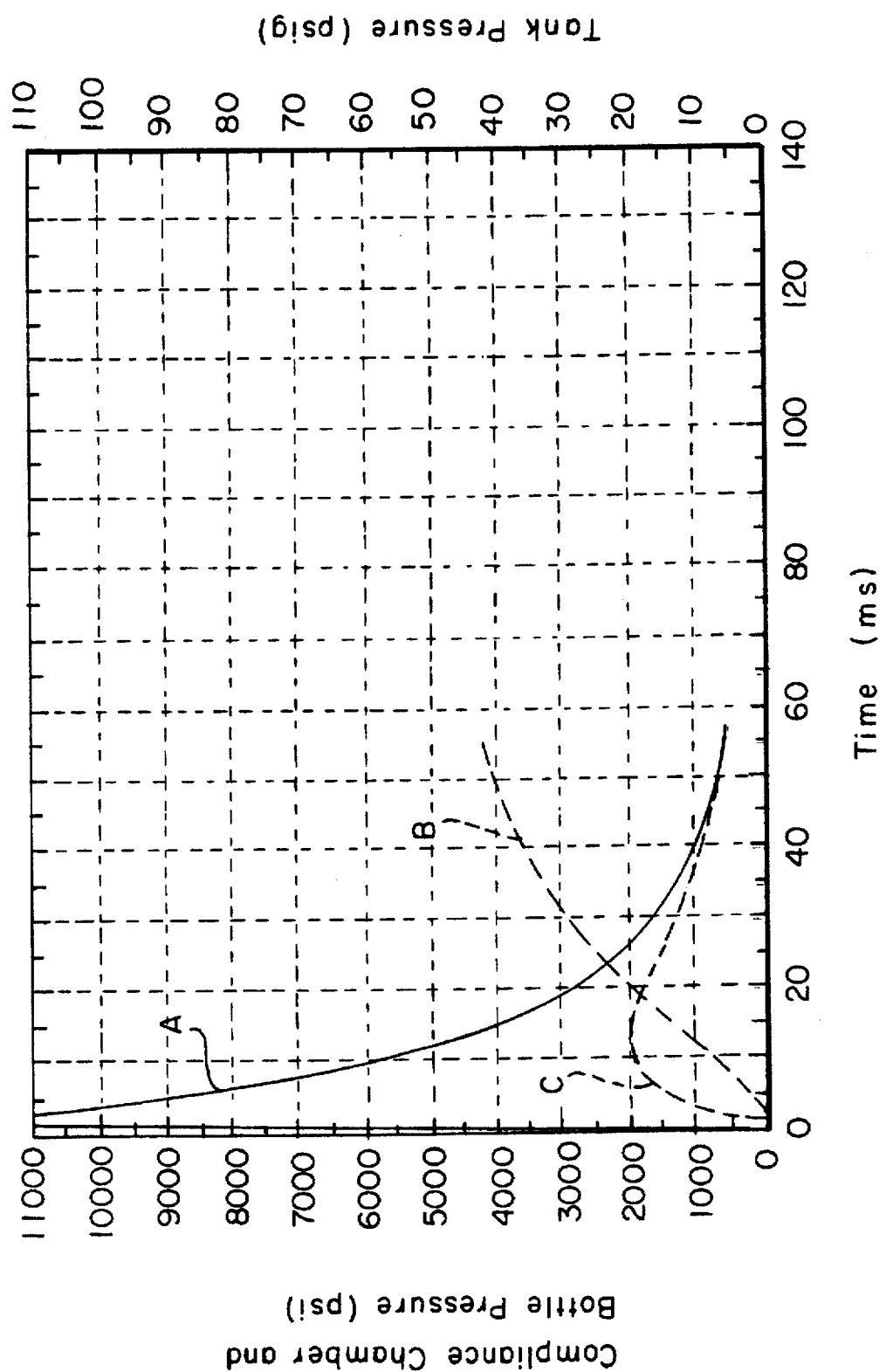

As shown in FIGS. 9 and 10, for a compliance chamber with a fixed exit area, increasing the compliance chamber free volume reduces the compliance chamber internal pressure and the airbag pressure rise rate (i.e., change in tank pressure versus time).

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. A combination comprising:
   an airbag inflator having an exit area defined by at least one exit opening wherethrough, upon actuation of said inflator, gas for the inflation of an airbag is exhausted, and
   a compliance chamber defined by a pressure vessel adapted to withstand an internal pressure of at least about 200 psi and formed about the inflator exit area, said compliance chamber having an exit area formed by at least one exit orifice wherethrough the gas for the inflation of the airbag is discharged to the airbag,
   wherein the maximum gaseous mass flow rate through the compliance chamber exit area being no more than about 300% of the average gaseous mass flow rate through the compliance chamber exit area and, during the first 10 milliseconds after the inflator begins exhausting gas, the total mass flow through the compliance chamber exit area is at least 20 percent less than the total mass flow through the inflator exit area.

2. The combination of claim 1 wherein said airbag inflator has a maximum gaseous mass flow rate through the inflator exit area of at least about 300% of the average gaseous mass flow rate through the inflator exit area.

3. The combination of claim 2 wherein said airbag inflator satisfies at least one of the following performance characteristics:
   a) the mass exiting said airbag inflator over the first 5 milliseconds after said inflator begins exhausting gas is greater than 15% of the total mass exiting said inflator and b) the mass exiting said airbag inflator over the first 10 milliseconds after said inflator begins exhausting gas is greater than 30% of the total mass exiting said inflator.

4. The combination of claim 3 wherein the mass exiting said airbag inflator over the first 5 milliseconds after said inflator begins exhausting gas is greater than 25% of the total mass exiting said inflator.

5. The combination of claim 3 wherein the mass exiting said airbag inflator over the first 10 milliseconds after said inflator begins exhausting gas is greater than 40% of the total mass exiting said inflator.

6. The combination of claim 1 wherein said airbag inflator is elongated and cylindrically shaped.

7. The combination of claim 1 wherein the pressure vessel of said compliance chamber is elongated and cylindrically shaped.

8. The combination of claim 1 wherein said airbag inflator utilizes a fuel material in the form of a fluid for the production of the inflation gas.

9. The combination of claim 1 wherein a free volume is formed between said airbag inflator and said pressure vessel, the free volume being in surrounding relation with said airbag inflator.

10. The combination of claim 1 wherein said airbag inflator is only partially received within said pressure vessel.

11. The combination of claim 1 wherein said airbag inflator has a maximum mass flow rate through the inflator exit area which occurs within 5 milliseconds after said airbag inflator begins exhausting gas.

12. The combination of claim 11 wherein said airbag inflator has a maximum mass flow rate through the inflator exit area which occurs within 2 milliseconds after said airbag inflator begins exhausting gas.

13. An airbag module subassembly comprising:

an inflator having an exit area defined by at least one exit opening wherethrough, upon actuation of said inflator, gas for the inflation of an airbag is exhausted, said inflator having;

a) a maximum gaseous mass flow rate through the inflator exit area of at least about 300% of the average gaseous mass flow rate through the inflator exit area, and b) the maximum mass flow rate through the inflator exit area occurs within 5 milliseconds after the inflator begins exhausting gas, and a one-piece reaction canister structure body part including first and second opposite side walls and a bridging portion joining said first and second opposite side walls wherein the bridging portion at least in part defines a pressure vessel adapted to withstand an internal pressure of at least about 200 psi, wherein at least the bridging portion and said inflator cooperate to define a compliance chamber about the inflator exit area, said compliance chamber having an exit area formed by at least one exit orifice wherethrough the gas for the inflation of the airbag is discharged to the airbag, said compliance chamber having;

a) a maximum gaseous mass flow rate through the compliance chamber exit area of no more than about 300% of the average gaseous mass flow rate through the compliance chamber exit area, and b) less than about 15% of the total mass exiting through the compliance chamber exit area exits within the first 5 milliseconds after the inflator begins exhausting gas.

14. The airbag module subassembly of claim 13 wherein the maximum mass flow rate through the inflator exit area occurs within 2 milliseconds after said airbag inflator begins exhausting gas.

15. The airbag module subassembly of claim 13 wherein the compliance chamber pressure vessel is adapted to withstand an internal pressure of at least about 500 psi.

16. The airbag module subassembly of claim 13 wherein said one-piece reaction canister structure body part is fabricated by a continuous extrusion of an extrudable material.

17. The airbag module subassembly of claim 13 wherein said one-piece reaction canister structure body part is fabricated of aluminum.

18. A method for the operation of an airbag inflator having an exit area defined by at least one exit opening wherethrough, upon actuation of the inflator, gas for the inflation of an airbag is exhausted, said method comprising the steps of:

exhausting gas for the inflation of the airbag through the inflator exit area and into a pressure vessel defining a compliance chamber about the inflator exit area, the compliance chamber pressure vessel being adapted to withstand an internal pressure of at least about 200 psi and having an exit area formed by at least one exit orifice, and discharging airbag inflation gas from the compliance chamber and into the airbag through the compliance chamber exit area at a maximum gaseous mass flow rate of no more than about 300% of the average gaseous mass flow rate through the compliance chamber exit area, wherein during the first 10 milliseconds after the inflator begins said exhausting of gas, the total mass flow through the compliance chamber exit area is least 20 percent less than the total mass flow through the inflator exit area.

19. The method of claim 18 wherein the maximum rate of said exhausting is at least about 300% of the average rate of said exhausting.

20. The method of claim 18 wherein at least one of the following performance characteristics is satisfied:

a) the mass exiting the airbag inflator over the first 5 milliseconds after the inflator begins said exhausting is greater than 15% of the total mass exiting the inflator and b) the mass exiting the airbag inflator over the first 10 milliseconds after the inflator begins said exhausting is greater than 30% of the total mass exiting the inflator.

21. The method of claim 18 wherein the mass exiting the airbag inflator over the first 5 milliseconds after the inflator begins said exhausting is greater than 25% of the total mass exiting the inflator.

22. The method of claim 18 wherein the mass exiting the airbag inflator over the first 10 milliseconds after the inflator begins said exhausting is greater than 40% of the total mass exiting the inflator.

23. The method of claim 18 wherein the maximum mass flow rate of said exhausting occurs within 5 milliseconds after the airbag inflator begins said exhausting.

24. The method of claim 18 wherein the maximum mass flow rate of said exhausting occurs within 2 milliseconds after the airbag inflator begins said exhausting.

* * * * *